US008888955B2

(12) United States Patent
Olausson

(10) Patent No.: US 8,888,955 B2
(45) Date of Patent: Nov. 18, 2014

(54) METHOD AND EQUIPMENT FOR THE EVAPORATION OF BLACK LIQUOR THAT IS OBTAINED FROM A DIGESTION PROCESS DURING THE PRODUCTION OF CELLULOSE PULP

(75) Inventor: Lars Olausson, Angered (SE)

(73) Assignee: Valmet Power AB, Gothenburg (SE)

( * ) Notice: Subject to any disclaimer, the term of this patent is extended or adjusted under 35 U.S.C. 154(b) by 443 days.

(21) Appl. No.: 12/513,505

(22) PCT Filed: Oct. 26, 2007

(86) PCT No.: PCT/SE2007/050786
§ 371 (c)(1),
(2), (4) Date: May 5, 2009

(87) PCT Pub. No.: WO2008/057031
PCT Pub. Date: May 15, 2008

(65) Prior Publication Data
US 2010/0071862 A1    Mar. 25, 2010

(30) Foreign Application Priority Data
Nov. 7, 2006    (SE) .................................... 0602361

(51) Int. Cl.
*B01D 1/26* (2006.01)
*D21C 11/10* (2006.01)
*D21C 7/10* (2006.01)
*B01D 3/10* (2006.01)
*B01D 5/00* (2006.01)

(52) U.S. Cl.
CPC .. *B01D 1/26* (2013.01); *B01D 3/10* (2013.01); *B01D 5/0036* (2013.01)

USPC ............................................... 162/47; 162/29

(58) Field of Classification Search
USPC ........................................................ 162/29, 47
See application file for complete search history.

(56) References Cited

PUBLICATIONS

Gullichsen et al., Chemical Pulping 6B, 1999, Fapet Oy, chapters 12, 17 and p. B281-284.*
The Chemical Engineers Resoruce Page, Pinch Technology:Basics for Beginners [downloaded online from arhcive.org : www.me.mtu.edu/~jwsuther/erdm/pinchtech.pdf], Sep. 12, 2006 [downloaded on Jul. 30, 2012].*
Reyes et al., A Modern ECF Fiberline for the Production of Bleached Eucalyptus Pulp, 2005, $2^{nd}$ ICEP.*
Clay, Evaporation Principles and Black Liquor Properties, 2008, TAPPI.*

* cited by examiner

*Primary Examiner* — Anthony Calandra
(74) *Attorney, Agent, or Firm* — Rolf Fasth; Fasth Law Offices

(57) ABSTRACT

The method and equipment are for the evaporation of hot black liquor obtained from a digestion process during the production of cellulose pulp. The black liquor is led to a multistage evaporation line with at least five evaporation stages. The black liquor that is to undergo evaporation in the evaporation line is cooled in at least one heat exchange process in a heat exchanger (HE1) against the partially evaporated black liquor that has undergone evaporation in at least one stage (I). The black liquor that is to undergo evaporation is cooled and the partially evaporated black liquor is heated by at least 5-10° C. The risk for the formation of foam and the separation of methanol are reduced. The greater part of the evaporation takes place at low temperature and at the lowest level of dry matter content in the liquor, which also suppresses encrustation in the stage.

10 Claims, 3 Drawing Sheets

METHOD AND EQUIPMENT FOR THE EVAPORATION OF BLACK LIQUOR THAT IS OBTAINED FROM A DIGESTION PROCESS DURING THE PRODUCTION OF CELLULOSE PULP

The present invention concerns a method to evaporate black liquor obtained from a digestion process during the production of cellulose pulp, where the black liquor is led to a multistage evaporation line with at least five evaporation stages, according to the introduction to claim 1. The invention concerns also equipment as specified by claim 11, in which equipment the method according to the invention can be applied.

THE PRIOR ART

The principal aim of the evaporation is to evaporate off water from the black liquor such that it can be used as fuel in a soda boiler. This is to be carried out such that the lowest possible quantity of fresh steam is consumed per evaporated quantity of water, such that the loss of recyclable digestion chemicals and wood-based substances is as low as possible, and such that the evaporated water can be reused in the processes of the pulp mill.

It is typical that the black liquor from a digestion plant maintains a dry matter content of approximately 15%, and a dry matter content greater than 60% is desired before the combustion. This means that approximately 5 tonnes of water per tonne of dry matter is to be removed.

The consumption of steam is to be kept as low as possible, and a process with at least five evaporation stages is used for this reason, in which fresh steam is supplied only at the final evaporation stage where the black liquor has the highest content of dry matter. The expelled steam, the liquor steam, is subsequently led in sequence through the other stages. The reduction in steam consumption in an evaporation line with five stages will be approximately 75% of what it would have been if only one stage were used. The reduction will be 80% if six stages are used. The difference in temperature is used maximally for an efficient transfer of heat by using the steam in stages, down to a high negative pressure in the first stage where the black liquor experiences its first increase in the level of dry matter. A negative pressure is normally maintained in the first three or four stages such that it is possible to obtain a larger part of the evaporation at low temperatures and at a low concentration of the black liquor. The boiling off of black liquor thus takes place in the range of temperatures 50-140° C. in the evaporation stages. The black liquor is further evaporated at the end of the evaporation stage using different types of superconcentrators to give levels of dry matter content of just over 80%, often with a preceding mixing step that mixes in ash from the soda boiler.

Heating of the black liquor before it is led to the evaporation stages can sometimes be carried out, in order to improve the heat efficiency. The book "Lutindunstning och biprodukter" ("Liquor evaporation and bi-products"), Yrkesbok Y-211, ISBN 91-7322-042-6, published by the Swedish Forest Industries Federation, for example, describes how the black liquor is heated in Kestner evaporators in a spiral pre-heater by means of steam that has been is expelled from the condensate withdrawer. The black liquor that is to undergo evaporation in Stage 1 is then led through a first heat exchanger connected to Stage 3, where the condensate steam from Stage 3 heats the black liquor, and where the black liquor is subsequently led through a second heat exchanger connected to Stage 2, where the condensate steam from Stage 2 heats the black liquor in a second heating stage.

The process in which an evaporated liquor from a condensing pre-steamer is allowed to exchange heat with a warmer and more highly evaporated liquor from a subsequent evaporation stage between two evaporation stages is known from EP 485375 (which is equivalent to U.S. Pat. No. 4,963,231). An internal increase in the efficiency of the evaporation line is here intended, in which an evaporation has already been carried out in an evaporation stage before the liquor is used for heat exchange. The aim here is that of, instead of cooling and condensing off low-value steam in a water-cooler, to cool the low-value steam in a condensing pre-steamer by the black liquor that is to undergo evaporation. The effect of exchanging heat between the liquors here is that the black liquor that is to undergo evaporation in the subsequent stage is heated by the heated liquor that arises in the subsequent stage.

AIM AND PURPOSE OF THE INVENTION

The present invention intends to offer an improved evaporation of black liquor, in which the following advantages are obtained:

- an improved heat economy, with a lower requirement of fresh steam;
- an improved separation of methanol through a cooling of the black liquor before evaporation, in order to avoid the mixing of flash steam, which is rich in methanol, with evaporation steam, which has a low methanol content, at any stage;
- a reduced risk of the formation of foam during the evaporation, by the replacement of liquor flashing by the cooling of black liquor;
- the first evaporation stages take place at a low level of dry matter content and low viscosity, which ensures favourable conditions for the transfer of heat during the first stages, and which thus provides optimal use of the installed heating surface;
- the recovery of heat energy between the black liquor that is to undergo evaporation and partially evaporated black liquor, such that the heat in the black liquor is used later in the evaporation line without loss of temperature level;
- makes possible an improved separation of soap for liquors from conifers, by a separation at low temperature and at a low solubility of soap.

DETAILED DESCRIPTION OF PREFERRED EMBODIMENTS

Figure 1:
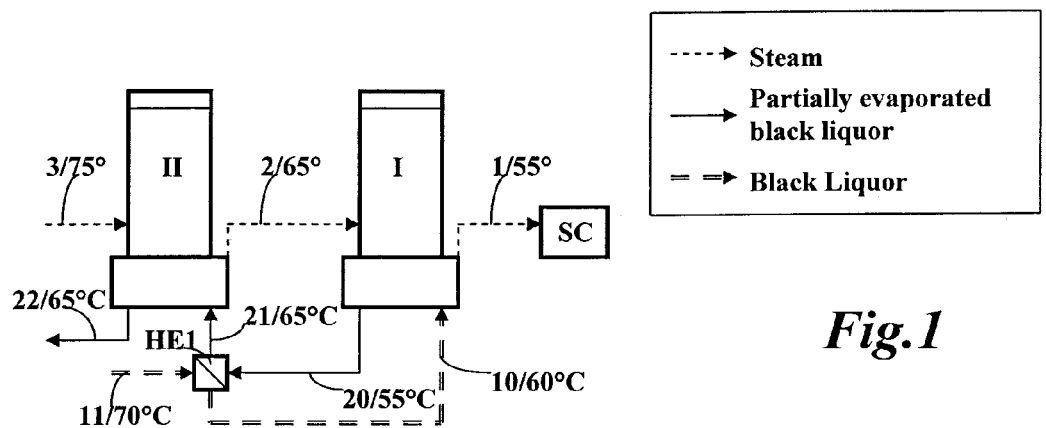
FIG. 1 shows the basic concept according to the invention, implemented between two evaporation stages.

FIG. 1 shows a part of a plant to evaporate hot black liquor obtained from a digestion process during the production of cellulose pulp, where the black liquor is led to a multistage evaporation line with at least five evaporation stages.

Each evaporation stage I and II has a supply line 10 and 21, respectively, for black liquor that maintains a first level of dry matter content and that is to undergo evaporation, and each evaporation stage has an outlet line 20 and 22, respectively, for black liquor that has undergone at least partial evaporation in the evaporation stage and maintains a second, higher, level of dry matter content.

Each evaporation stage is provided with a supply line 3 and 2, respectively, for steam that maintains a first steam temperature that is used in the evaporation stages, and each evaporation stage is provided with an outlet line 2 and 1, respectively, for steam that has been used in the evaporation stage and that maintains a second, lower, steam temperature after the evaporation stage.

The figure shows two evaporation stages I and II where the steam that is used is led in a flow through the lines 3, 2 and 1 in a countercurrent flow relative to the flow of black liquor, which is led through the lines 10, 20, 21 and 22. The expelled and the generated steam is condensed in a conventional manner in a surface condenser SC, from which heated water is obtained.

The figure shows a first heat exchanger unit HE1, which is connected to a first evaporation stage, which first heat exchanger unit HE1 has a first inlet and a first outlet to the heating side of the heat exchanger unit where the first inlet of the first heat exchanger unit is connected to the outlet line 20 for black liquor from the evaporation stage I, and where the first heat exchanger unit has a second inlet, connected to the line 11, and a second outlet, connected to the line 10, to the cooling side of the heat exchanger unit, where the second inlet 11 of the heat exchanger unit is connected to hot black liquor that has not yet passed through an evaporation process in any evaporation stage.

Hot black liquor obtained from a digestion process during the production of cellulose pulp undergoes evaporation in this manner such that the hot black liquor that is to undergo evaporation in the evaporation line is cooled by heat exchange with partially evaporated black liquor that has been at least partially evaporated in an evaporation stage in the evaporation line.

Temperatures for black liquor and steam for a putative application will be presented in the following, presented in FIG. 1, but where it is clear that other temperatures can be valid in other applications. The black liquor that is to undergo evaporation is led in line 11 and maintains a temperature of 70° C. before it reaches the heat exchanger HE1. The black liquor that is to undergo evaporation is cooled in this heat exchanger by at least 5° C., preferably by at least 10° C., to a temperature of 60° C., against partially evaporated liquor that is led in the line 20 and that has already experienced evaporation in Stage I. The partially evaporated liquor, which maintains a temperature of approximately 55° C., is heated by an equivalent degree to a temperature of 65° C., before it is led though the line 21 to the evaporation stage II. The flows of steam in the lines 3, 2 and 1 maintain temperatures of 75° C., 65° C., and 55° C., respectively.

This coupling allows the temperature of the black liquor to be reduced before it is to undergo evaporation in the first stage, without its content of methanol being released too early and without the risk of the transfer of liquor to condensate through foam formation. The major part of the process of evaporation takes place in the first evaporation stage, where the temperature is lowest, while the viscosity of the liquor can even so be retained at an acceptably low level, through the low level of dry matter content, thus ensuring a high ratio of heat transfer.

Figure 2:
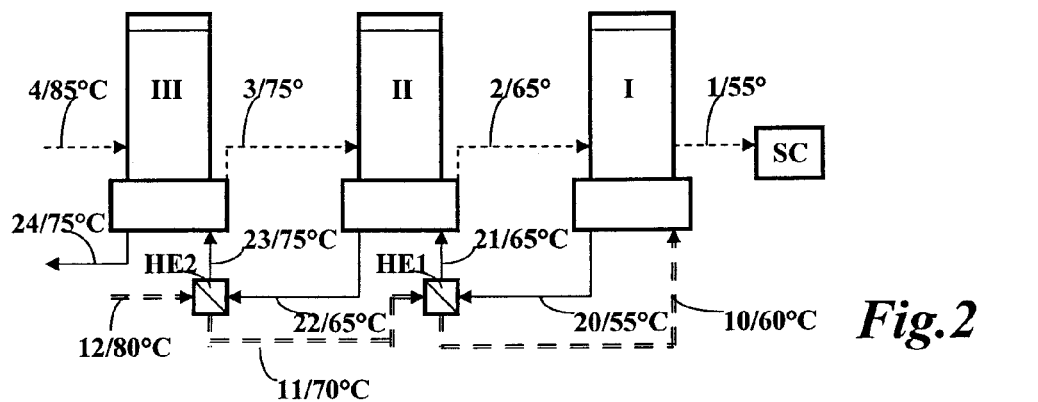
FIG. 2 shows the invention implemented between three evaporation stages.

FIG. 2 shows a variant in which a further second heat exchanger unit HE2 has been connected between evaporation stages II and Ill, but which is otherwise the same as the plant shown in FIG. 1.

The second heat exchanger unit HE2 is connected to a second evaporation stage II, which second heat exchanger unit has a first inlet, connected to the line 22, and a first outlet, connected to the line 23, to the heating side of the second heat exchanger unit, where the first inlet of the second heat exchanger unit is connected to the outlet line 22 for black liquor from the second evaporation stage II, (this does not agree accurately with claim 12) and where the second heat exchanger HE2 has a second inlet, connected to the black liquor line 12, and a second outlet, connected to the line 11, to the cooling side of the second heat exchanger unit, where the second inlet to the second heat exchanger unit is connected to hot black liquor that has not yet undergone evaporation in any evaporation stage, and where the hot black liquor that has not yet undergone evaporation in any evaporation stage is first led to the cooling side of the second heat exchanger unit before it is led through a transfer line 11 to the cooling side of the first heat exchanger unit HE1.

The hot black liquor that is to undergo evaporation is in this manner cooled at least two times in heat exchange with partially evaporated black liquor that has undergone at least partial evaporation in a first and in a second evaporation stage in the evaporation line.

FIG. 2 shows that the black liquor is led directly to Stage I. In practice, the is black liquor can be led once its temperature has fallen below 100° C. to a black liquor tank for storage or for the separation of soap. It is preferable that this storage is located after cooling to 60° C. (which is the optimal temperature with respect to the solubility of soap), i.e. after the liquor cooler HE1 and before Stage I.

The technology can be used in a number of further stages, but in practice the maximum number of stages is 3-6, where a third heat exchanger unit is connected to a third evaporation stage in the same manner as the second heat exchanger unit was added to the plant in FIG. 2. The third heat exchanger unit has in the same manner a first inlet and a first outlet to the heating side of the third heat exchanger unit where the first inlet of the third heat exchanger unit is connected to the outlet line for black liquor from the third evaporation stage, and where the third heat exchanger unit has a second inlet and a second outlet to the cooling side of the third heat exchanger unit, where the second inlet of the third heat exchanger unit is connected to hot black liquor that has not yet undergone evaporation in any evaporation stage, and where the hot black liquor that has not yet undergone evaporation in any evaporation stage is first led to the cooling side of the third heat exchanger unit before it is led through transfer lines to the cooling sides of the second and the first heat exchanger units.

The hot black liquor that is to undergo evaporation is in this manner cooled at least three times in heat exchange with partially evaporated black liquor that has undergone at least partial evaporation in a first, in a second, and in a third evaporation stage.

The first, second and, where relevant, third evaporation stages are preferably connected in series in the evaporation plant, where the black liquor that is to undergo evaporation in the evaporation stages is led in series from the first to the second, and onwards to the third, and possibly also onwards to a fourth evaporation stage via the heating sides of the heat exchangers. The partially evaporated black liquor from a first, a second and possibly also a third (or even more) evaporation stage is in this way used for the exchange of heat with the hot black liquor, where the partially evaporated black liquor experiences an increase in the level of dry matter content from the first to the second evaporation stage, and a further increase in the level of dry matter content from the second to the third evaporation stage.

Figure 3:
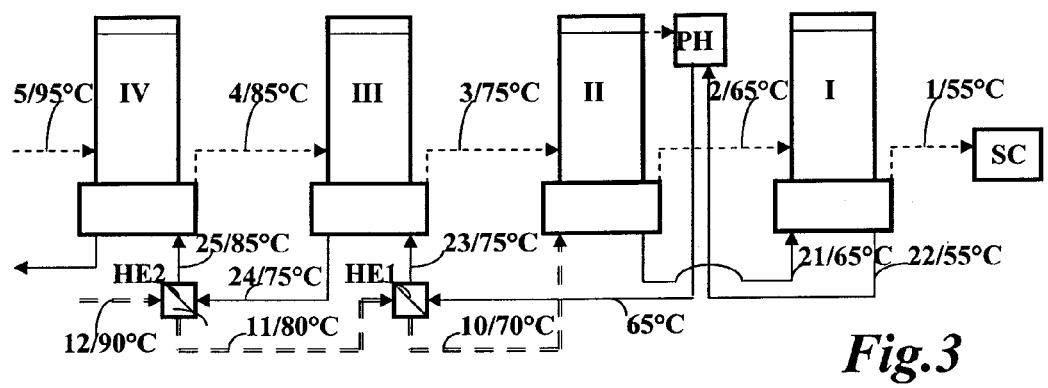
FIG. 3 shows the invention implemented in a mixed liquor connection in which the black liquor that is to undergo evaporation is led in cocurrent flow in Stages I and II, and in countercurrent flow in Stages III and IV.

FIG. 3 shows a further variant of the invention in which the black liquor that is to undergo evaporation is led to a first heat exchange with partially evaporated black liquor in the heat exchanger HE2 that is connected between Stage III and Stage IV. The black liquor is led after this first exchange of heat to a second heat exchange with partially evaporated black liquor in heat exchanger HE1, connected between Stage II and Stage III. Stages I and II are coupled using a cocurrent flow connection (in which the black liquor that is to undergo evaporation has the same sequence of flow through the evaporation stage as the steam). The above is an illustration of the fact that the cooling of liquor need not encompass the complete evaporation process. It is preferable that any black liquor tanks that are to be used for the separation of soap are placed after HE1. They may also be placed earlier in the flow of liquor, as soon as the temperature of the liquor has fallen below 100° C.

The first evaporation of the black liquor takes place here at Stage II, using black liquor that has first been cooled in the heat exchangers HE1 and HE2 in a manner similar to that shown in FIG. 2. The cooled liquor undergoes a first evaporation process in Stage II, after which the partially evaporated black liquor is led to Stage I. The partially evaporated liquor that has passed through Stages II and I is subsequently led to Stage III through a preheater PH and through the heat exchanger HE1.

The inlet to the heating side of the heat exchanger is connected, in the normal alternative that is shown in FIGS. 1-3, to a transfer line that transfers the black liquor that has undergone evaporation from one preceding evaporation stage to a subsequent evaporation stage. The partially evaporated black liquor that has been removed from the transport flow between two evaporation stages is in this way used for the exchange of heat with the hot black liquor.

Figure 4:
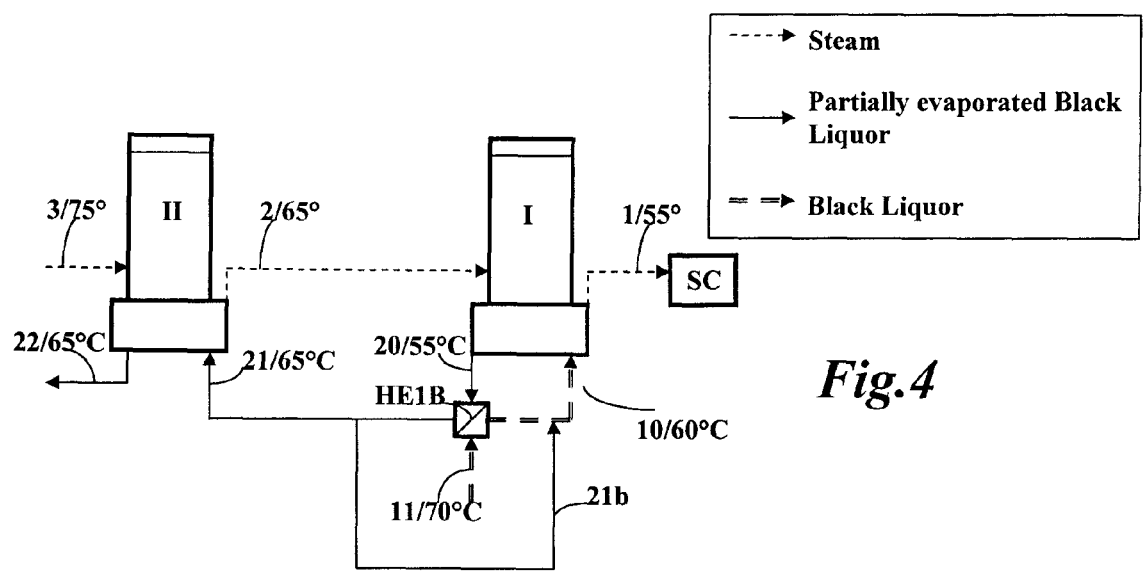
FIG. 4 shows the invention implemented in a stage with internal circulation.

In an alternative embodiment of the evaporation plant, shown in FIG. 4, a partial amount of the partially evaporated and heated black liquor is recycled over the evaporation stage with a recycling line 21b.

Figure 5:
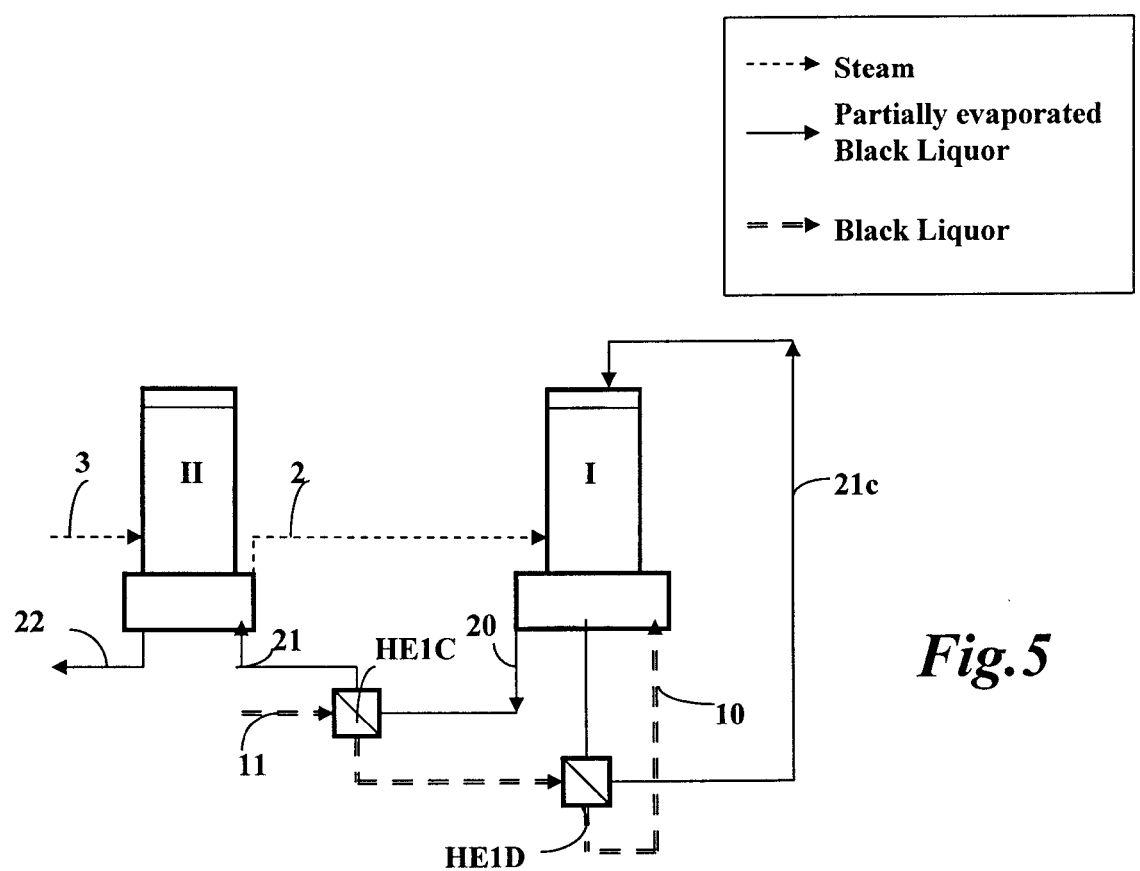
FIG. 5 shows a variant of the invention with internal circulation in Stage I.

The connection shown in FIG. 1 can, in an alternative design, be combined with further black liquor coolers for the heating of partially pre-evaporated black liquor in a flow of liquor over a black liquor cooler. FIG. 5 shows how a parallel flow of partially evaporated black liquor is led to a liquor cooler HE1D and led from there back to Stage I, either together with the supply flow to the stage or in its own supply flow. Cooled black liquor from HE1C is led to HE1D for further cooling before it is supplied to Stage 1 through the line 10. It is also possible for HE1D to be integrated with the stage.

The evaporation plant may also be modified in several ways where the black liquor can undergo some form of pre-evaporation or treatment, before heat exchange takes place between black liquor that has been at least partially subject to evaporation in an evaporation stage in the evaporation line. This may take place as early as in connection with the digestion plant or in an evaporation stage within the evaporation process. This pre-treatment may take place through a reduction of pressure or through an increase in viscosity brought about by the addition of partially evaporated black liquor, the latter process being known as "sweetening". The hot black liquor obtained from the digestion process can thus be led through at least one cooler, in which cold water cools the black liquor in a heat exchanger, or through a pressure-release tank, or through both, before the hot black liquor is led to a first heat exchanger in which partially evaporated liquor is heated by the hot black liquor. The hot black liquor obtained from the digestion process experiences in this manner at least one cooling stage before undergoing heat exchange with to partially evaporated black liquor that has undergone at least partial evaporation in an evaporation stage in the evaporation line.

The invention can advantageously be applied in such a manner that the hot black liquor is cooled to an extensive degree by at least 5-10° C. in each heat exchange operation with the partially evaporated black liquor, and in such a manner that the partially evaporated black liquor is heated by at least 5-10° C. in each heat exchange operation with the hot black liquor. The black liquor can, naturally, be cooled both against transport liquor between two stages and against circulation liquor within a stage.

The heat exchanger in the evaporation plant is preferably a tube heat exchanger or a plate heat exchanger, in which hot black liquor is led on one side of the heat exchanger and partially evaporated liquor that has passed through at least one evaporation stage is led on the other side of the heat exchanger. The heat exchange in this way takes place through indirect heat exchange in a heat exchanger, without these liquors being mixed, and the methanol content, for example, of the black liquor that is to undergo evaporation being kept intact.

The invention is not limited to use in an evaporation plant in which a total of n evaporation stages are present in the evaporation line, arranged in strict countercurrent flow connection where the steam that is used for the evaporation is led through steam transfer lines from evaporation stage n to evaporation stage n−1, etc., and down to evaporation stage 1, and where the hot black liquor that is to undergo evaporation is led in countercurrent flow to the flow of steam through transfer lines for partially evaporated black liquor from evaporation stage 1 to evaporation stage 2, etc., and up to evaporation stage n. Use in a strict countercurrent flow is, however, advantageous, since the first evaporation takes place at the lowest level of dry matter content and at the lowest viscosity of the black liquor, which ensures a high ratio of heat transfer.

The invention can be varied in a number of ways within the framework of the patent claims.

The pressure of the black liquor may, for example, be reduced before the liquor is led to the first heat exchange against partially evaporated black liquor. The steam that is obtained from such a reduction in pressure can, for example, be mixed with liquor steam that is led between evaporation stages is higher in the evaporation line: it may, for example, be mixed with liquor steam that is led from stage 6 to stage 5. If the black liquor that is obtained from the digestion process is kept under pressure and maintains a temperature of, for example, 110° C., its pressure can then be reduced to give a temperature of 100-105° C., where the steam from the pressure-reduction step is mixed with liquor steam that maintains an equivalent temperature. In the most advantageous embodiment, however, the black liquor is led directly from the digestion plant at, for example, 110° C., through one or several liquor coolers that retrieve the heat of the black liquor without flashing. This is advantageous since the flashing of black liquor involves the risk of the formation of foam, and a poorer separation of methanol.

Each heat exchanger unit in which the black liquor is cooled against partially evaporated black liquor may be constituted also by one or several heat exchanger units coupled in series or in parallel.

The temperatures that have been specified in FIGS. 1-3 are type examples of established temperature levels for the implementation of the invention.

The term "black liquor" is used to denote black liquor from a digestion process in which this black liquor has not undergone any evaporation stage in the evaporation stages of the evaporation line, and that maintains a level of dry matter content of less than 30%. The black liquor may, however, have previously undergone cooling, conditioning ("sweetening"), or another form of evaporation, for example through mechanical steam compression or with another steam than the one that takes place in the evaporation line with the fresh steam or liquor steam that is led in series through the evaporation stages.

The term "partially evaporated black liquor" is used to denote a black liquor that has undergone at least one evaporation stage in the evaporation line with the fresh steam or liquor steam that is led in series through the evaporation stages.

The invention is particularly advantageous for the evaporation of black liquor from sulphate digestion, and it is further advantageous if the sulphate digestion is based on conifer wood, primarily pine. This type of wood contains high levels of extractive substances (soap) that readily cause problems with foaming for liquor that has not been desoaped.

The invention claimed is:

1. A method to evaporate hot black liquor, comprising:
   providing a multistage evaporation line having at least two evaporation stages,
   obtaining hot black liquor from a digestion process during a production of cellulose pulp,
   conveying the hot black liquor to a heat exchanger,
   cooling the hot black liquor to form a cooled black liquor by exchanging heat in the heat exchanger with a partially evaporated black liquor from a first evaporation stage, and
   the cooling of the hot black liquor in the heat exchanger reducing foam formation during subsequent evaporation by cooling the hot black liquor,
   conveying the cooled black liquor from the heat exchanger to the first evaporation stage,
   evaporating the cooled black liquor in the first evaporation stage to produce the partially evaporated black liquor,
   conveying the partially evaporated black liquor from the first evaporation stage to the heat exchanger, and
   conveying the partially evaporated black liquor from the heat exchanger to a second evaporation stage.

2. The method according to claim 1, wherein the hot black liquor is cooled at least twice in heat exchange with the partially evaporated black liquor that has undergone at least partial evaporation in a first and in a second evaporation stage in the multistage evaporation line.

3. The method according to claim 2, wherein the hot black liquor is cooled at least three times in heat exchange with the partially evaporated black liquor that has undergone at least partial evaporation in a first, in a second, and in a third evaporation stage.

4. The method according to claim 3, wherein the partially evaporated black liquor that is used for the heat exchange against the hot black liquor is obtained from the first, the second and a third evaporation stage wherein the partially evaporated black liquor experiences an increase in a level of dry matter content from the first to the second evaporation stage and a further increase in the level of dry matter content from the second to the third evaporation stage.

5. The method according to claim 1 wherein the partially evaporated black liquor that is used for the heat exchange against the hot black liquor is withdrawn from an internal circulation in an evaporation stage.

6. The method according to claim 1 wherein the partially evaporated black liquor that is used for the heat exchange against the hot black liquor is withdrawn from a transport circulation between two evaporation stages.

7. The method according to claim 1 wherein the hot black liquor obtained from the digestion process undergoes at least one cooling stage before undergoing the heat exchange with the partially evaporated black liquor that has undergone at least partial evaporation in an evaporation stage in the multistage evaporation line.

8. The method according to claim 2 wherein the hot black liquor is cooled by at least 5° C. in each heat exchange operation with the partially evaporated black liquor, and the partially evaporated black liquor is heated by at least 5° C. in each heat exchange operation with the hot black liquor.

9. The method according to claim 1 wherein the heat exchange takes place through indirect heat exchange in a heat exchanger.

10. The method according to claim 1 wherein a total of (n) evaporation stages are present in the multistage evaporation line, arranged in a strict countercurrent flow connection, steam that is used for the evaporation is led from evaporation stage (n) to evaporation stage (n−1) down to evaporation stage 1, and the hot black liquor that is to undergo evaporation is led in a countercurrent flow to a flow of steam from evaporation stage 1 to evaporation stage 2 and up to evaporation stage (n).

* * * * *